(12) United States Patent
Imakawa et al.

(10) Patent No.: US 11,335,367 B2
(45) Date of Patent: May 17, 2022

(54) ALUMINUM ALLOY SUBSTRATE FOR MAGNETIC DISK, DISK DRIVE DEVICE, METHOD FOR MANUFACTURING ALUMINUM ALLOY SUBSTRATE FOR MAGNETIC DISK, AND METHOD FOR MEASURING ALUMINUM ALLOY SUBSTRATE FOR MAGNETIC DISK

(71) Applicants: FURUKAWA ELECTRIC CO., LTD., Tokyo (JP); UACJ CORPORATION, Tokyo (JP)

(72) Inventors: Kimie Imakawa, Tokyo (JP); Toshihiro Nakamura, Tokyo (JP); Hideki Takahashi, Tokyo (JP); Keita Yoshimura, Tokyo (JP); Wataru Kumagai, Tokyo (JP); Naoki Kitamura, Tokyo (JP); Kotaro Kitawaki, Tokyo (JP)

(73) Assignees: FURUKAWA ELECTRIC CO., LTD., Tokyo (JP); UACJ CORPORATION, Tokyo (JP)

(*) Notice: Subject to any disclaimer, the term of this patent is extended or adjusted under 35 U.S.C. 154(b) by 0 days.

(21) Appl. No.: 17/028,885

(22) Filed: Sep. 22, 2020

(65) Prior Publication Data
US 2021/0082465 A1   Mar. 18, 2021

Related U.S. Application Data

(63) Continuation of application No. PCT/JP2019/011410, filed on Mar. 19, 2019.

(30) Foreign Application Priority Data

Mar. 23, 2018   (JP) .............................. JP2018-056479

(51) Int. Cl.
*G11B 5/82* (2006.01)
*G11B 5/73* (2006.01)
*G11B 5/84* (2006.01)

(52) U.S. Cl.
CPC ............ *G11B 5/73919* (2019.05); *G11B 5/82* (2013.01); *G11B 5/8404* (2013.01)

(58) Field of Classification Search
None
See application file for complete search history.

(56) References Cited

U.S. PATENT DOCUMENTS 4,936,180 A * 6/1990 Michael .................. B23Q 7/04
451/335
5,983,167 A * 11/1999 Ebisawa .............. G01B 11/306
702/155

(Continued)

FOREIGN PATENT DOCUMENTS

CN    102016987 A    4/2011
CN    103325390 A    9/2013

(Continued)

OTHER PUBLICATIONS

English translation of International Preliminary Report on Patentability for Application No. PCT/JP2019/011410, dated Sep. 29, 2020.

(Continued)

*Primary Examiner* — Jefferson A Evans
(74) *Attorney, Agent, or Firm* — Dorsey & Whitney LLP

(57) ABSTRACT

An aluminum alloy substrate (1) for magnetic disk satisfies at least two of three inequalities of an inequality group [A] and satisfies all of four inequalities of an inequality group [B], or satisfies at least two of the three inequalities of the inequality group [A] and satisfies all of four inequalities of an inequality group [C], when a plate thickness of the disk at a position (b1) is defined as $t_{b1}$, a plate thickness at a (Continued)

position (b2) is defined as $t_{b2}$, a plate thickness at a position (b3) is defined as $t_{b3}$, a plate thickness at a position (a1) is defined as $t_{a1}$, a plate thickness at a position (a2) is defined as $t_{a2}$, and a plate thickness at a position (a3) is defined as $t_{a3}$.

8 Claims, 5 Drawing Sheets

(56) References Cited

U.S. PATENT DOCUMENTS

| | | | | |
|---|---|---|---|---|
| 6,504,386 | B1* | 1/2003 | Bhushan | G01Q 10/06 |
| | | | | 324/671 |
| 6,808,783 | B1* | 10/2004 | Lin | G11B 5/64 |
| | | | | 428/156 |
| 7,128,803 | B2* | 10/2006 | Owczarz | B24B 1/005 |
| | | | | 156/345.13 |
| 7,309,618 | B2* | 12/2007 | Gotkis | B24B 1/005 |
| | | | | 156/345.13 |
| 9,406,330 | B1* | 8/2016 | Kong | G06T 7/001 |
| 2003/0041526 | A1* | 3/2003 | Fujii | C09K 3/1463 |
| | | | | 51/307 |
| 2004/0092103 | A1* | 5/2004 | Fujii | B24B 37/044 |
| | | | | 438/689 |
| 2008/0055762 | A1 | 3/2008 | Shimazawa et al. | |
| 2010/0028720 | A1* | 2/2010 | Nishida | H01J 37/3455 |
| | | | | 428/826 |
| 2011/0051282 | A1 | 3/2011 | Fukushima | |
| 2012/0065931 | A1* | 3/2012 | Krucinski | B65H 7/02 |
| | | | | 702/170 |
| 2014/0016225 | A1 | 1/2014 | Dee | |
| 2015/0332722 | A1* | 11/2015 | Tamaki | G11B 5/73921 |
| | | | | 428/827 |
| 2016/0351224 | A1 | 12/2016 | Kitawaki et al. | |
| 2018/0190316 | A1 | 7/2018 | Kitawaki et al. | |
| 2020/0096308 | A1* | 3/2020 | Hughes | G01B 11/06 |
| 2021/0407544 | A1* | 12/2021 | Osakabe | G11B 5/739 |

FOREIGN PATENT DOCUMENTS

| | | |
|---|---|---|
| CN | 104109783 A | 10/2014 |
| CN | 105163908 A | 12/2015 |
| CN | 105745344 A | 7/2016 |
| CN | 107532245 A | 1/2018 |
| JP | S62134514 A | 6/1987 |
| JP | 2000230908 A | 8/2000 |
| JP | 2003263731 A1 | 9/2003 |
| JP | 2004063028 A | 2/2004 |
| JP | 3960533 B2 | 5/2007 |
| JP | 2013112884 A1 | 6/2013 |
| JP | 2013164889 A | 8/2013 |
| JP | 2014105376 A | 6/2014 |
| JP | 2016021274 A | 2/2016 |

OTHER PUBLICATIONS

English translation of Written Opinion, for Application No. PCT/JP2019/011410, dated Jun. 4, 2019.
English translation of Office Action for CN Application No. 201980021564.4, dated Mar. 19, 2021.
English translation of Office Action for JP Application No. 2018-056479, dated Mar. 1, 2021.

* cited by examiner

ALUMINUM ALLOY SUBSTRATE FOR MAGNETIC DISK, DISK DRIVE DEVICE, METHOD FOR MANUFACTURING ALUMINUM ALLOY SUBSTRATE FOR MAGNETIC DISK, AND METHOD FOR MEASURING ALUMINUM ALLOY SUBSTRATE FOR MAGNETIC DISK

CROSS REFERENCE TO RELATED APPLICATIONS

The present application is a continuation application of International Patent Application No. PCT/JP2019/011410 filed on Mar. 19, 2019, which claims priority to Japanese Patent Application No. 2018-056479, filed on Mar. 23, 2018. The contents of these applications are incorporated herein by reference in their entirety.

BACKGROUND

Technical Field

The present disclosure relates to an aluminum alloy substrate for magnetic disk, a disk drive device, a method for manufacturing an aluminum alloy substrate for magnetic disk, and a method for measuring an aluminum alloy substrate for magnetic disk, and particularly relates to an aluminum alloy substrate for magnetic disk that is used as a recording medium for a computer, and a method for manufacturing the aluminum alloy substrate.

Description of the Related Art

Conventionally, in computers, disk drive devices such as hard disk drives (hereinafter, referred to as "HDD") have been widely used. An HDD generally includes one or a plurality of magnetic disks storing data, a spindle motor that rotates a magnetic disk, a clamp member that fixes an inside diameter side portion of the magnetic disk, a magnetic head that performs data processing to the respective magnetic disks, a swing arm that movably supports the magnetic head to the magnetic disks, and an actuator that rotates and positions the swing arm.

In the HDD like this, high speed rotation of the magnetic disk is required to perform high-speed data processing. However, when the disk rotates at a high speed, air flow occurs by air that rotates with the disk, and by a disturbance of the air flow, a phenomenon called fluttering in which the disk vibrates occurs. The fluttering like this deteriorates flying stability of the magnetic head, so that positioning accuracy of the magnetic head to the disk reduces, and becomes a factor that hinders improvement of recording density.

It is known that flatness of a magnetic disk greatly affects the flying stability of the magnetic head. Thus, as a method of decreasing the flatness of a magnetic disk (high planarization), there is proposed a method in which a punched aluminum alloy substrate has a plate thickness surface sum of 0.02 mm$^2$ or less, in the method for manufacturing an aluminum alloy substrate for magnetic disk that applies annealing to the aluminum alloy substrate produced by punching an aluminum alloy plate to be used as a magnetic disk into a donut shape of a predetermined size while applying a load to the aluminum alloy substrate. In the manufacturing method, when a plate thickness measurement straight line separated by 5 mm outward of an inner peripheral circle is drawn to be parallel with the rolling direction of the aluminum alloy substrate and to continue from one part to another part of the outer peripheral circle, the two points at the positions separated by 5 mm inward of the outer peripheral circle of the aluminum alloy substrate on the above described plate thickness measurement straight line are set as a measurement start point and a measurement end point, a plate thickness distribution line is created by setting a horizontal axis as a distance from the above described measurement start point to the measurement end point, and setting a vertical axis as a plate thickness from plate thickness measurement values obtained by performing measurement to the above described plate thickness measurement straight line from the above described measurement start point to the above described measurement end point, and the above described plate thickness area sum is defined by an area sum of a region surrounded by a reference straight line connecting both plate thickness measurement values at the above described measurement start point and the above described measurement end point of the plate thickness distribution curve, and the aforementioned plate thickness distribution curve (Japanese Patent No. 3960533).

SUMMARY

However, although the above described conventional manufacturing method can decrease flatness of the aluminum alloy substrate with respect to the rolling direction, the flatness of the aluminum alloy substrate in the directions other than the rolling direction is unknown, the flying stability of the magnetic head at the time of rotation of the magnetic disk cannot be said as sufficient, positioning accuracy of the magnetic head to the magnetic disk is still reduced, and there is a possibility of hindering improvement in recording density.

The present disclosure provides an aluminum alloy substrate for magnetic disk that can realize high planarization of the entire aluminum alloy substrate and further improve flying stability of a magnetic head, a magnetic disk drive device, a method for manufacturing the aluminum alloy substrate for magnetic disk, and a method for measuring a magnetic disk.

As a result of performing diligent examination of the above described problem, the present inventors have found out that by defining the plate thicknesses at a plurality of predetermined positions of the aluminum alloy substrate by using angles from the direction of the rolling line formed in a constant direction along the rolling direction, that is, from the rolling line direction and distances from the disk center, and satisfying a plurality of conditional expressions expressed by using the plate thicknesses at the plurality of predetermined positions, a good plate thickness distribution in the entire aluminum alloy substrate can be obtained, high planarization of the entire aluminum alloy substrate is realized, and flying stability of the magnetic head can be further improved.

More specifically, gist configurations of the present disclosure are as follows.

[1] An aluminum alloy substrate for magnetic disk, satisfying at least two of three inequalities of an inequality group [A] as follows and satisfying all of four inequalities of an inequality group [B] as follows, or satisfying at least two of the three inequalities of the inequality group [A] as follows and satisfying all of four inequalities of an inequality group [C] as follows, when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

[2] The aluminum alloy substrate for magnetic disk according to the above described [1], further satisfying all of four inequalities of an inequality group [D] as follows.

$$\{|t_{a1}-t_{a2}|<0.5\ \mu m, |t_{a2}-t_{a3}|<<0.5\ \mu m, |t_{b1}-t_{b2}|<0.5\ \mu m, |t_{b2}-t_{b3}|<0.5\ \mu m\} \quad [D]$$

[3] The aluminum alloy substrate for magnetic disk according to the above described [1], wherein the plate thickness of the disk is a value measured based on respective physical quantities on a front surface side and a back surface side of the disk, by using a pair of sensor portions of a capacitive displacement meter that are arranged opposite to each other on both sides in a thickness direction of the disk.

[4] A disk drive device, including:
one or a plurality of magnetic disks rotatably supported via a spindle in a casing;
a magnetic head that performs data processing to the magnetic disk;
a swing arm that supports the magnetic head movably to the magnetic disk; and
an actuator that rotates and positions the swing arm,
wherein the magnetic disk
satisfies at least two of three inequalities of an inequality group [A] as follows and satisfies all of four inequalities of an inequality group [B] as follows, or
satisfies at least two of the three inequalities of the inequality group [A] as follows and satisfies all of four inequalities of an inequality group [C] as follows,
when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

[5] A method for manufacturing an aluminum alloy substrate for magnetic disk, including:

producing an aluminum alloy plate by performing casting, hot-rolling, and cold-rolling, as an aluminum alloy plate producing step;
producing an aluminum alloy substrate for magnetic disk by punching the aluminum alloy plate into an annular shape, as a punching step; and
applying pressure annealing to the aluminum alloy substrate for magnetic disk, as a pressure annealing step,
wherein the aluminum alloy substrate for magnetic disk satisfies at least two of three inequalities of an inequality group [A] as follows and satisfies all of four inequalities of an inequality group [B] as follows, or
satisfies at least two of the three inequalities of the inequality group [A] as follows and satisfies all of four inequalities of an inequality group [C] as follows,
when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

[6] The method for manufacturing an aluminum alloy substrate for magnetic disk according to the above described [5], further including, before the pressure annealing step, selecting an aluminum alloy substrate that satisfies at least two of the three inequalities of the inequality group [A] and satisfies all of the four inequalities of the inequality group [B], or satisfies at least two of the three inequalities of the inequality group [A] and satisfies all of the four inequalities of the inequality group [C], as a selection step.

[7] The method for manufacturing an aluminum alloy substrate for magnetic disk according to the above described [6], wherein the selection step further selects an aluminum alloy substrate that satisfies at least one of four inequalities of an inequality group [D] as follows.

$$\{|t_{a1}-t_{a2}|<0.5\ \mu m, |t_{a2}-t_{a3}|<0.5\ \mu m, |t_{b1}-t_{b2}|<0.5\ \mu m, |t_{b2}-t_{b3}|<0.5\ \mu m\} \quad [D]$$

[8] A method for measuring an aluminum alloy substrate for magnetic disk, including:
rotating the aluminum alloy substrate for magnetic disk by a predetermined angle in a circumferential direction of the aluminum alloy substrate for magnetic disk, and moving a pair of sensor portions of a capacitive displacement meter in a radial direction of the aluminum alloy substrate for magnetic disk; and
measuring a plate thickness of the aluminum alloy substrate for magnetic disk based on respective physical quantities on a front surface side and a back surface side of the aluminum alloy substrate for magnetic disk that are detected by the pair of sensor portions.

The present disclosure can realize high planarization of the entire aluminum alloy substrate and further improve flying stability of a magnetic head.

DESCRIPTION OF EMBODIMENTS

Hereinafter, embodiments of the present disclosure will be described with reference to the drawings.

Figure 1:
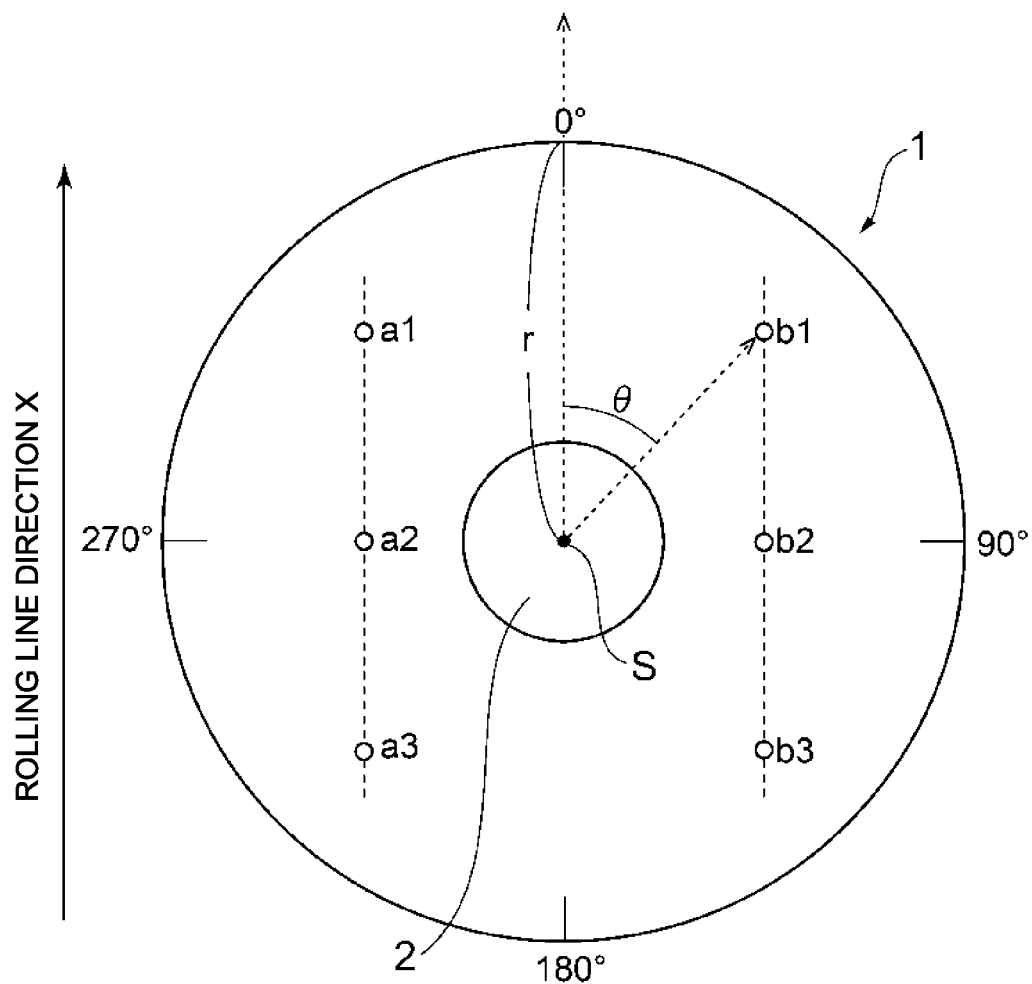
FIG. 1 is a plan view of an embodiment of the present disclosure schematically illustrating a configuration of an aluminum alloy substrate for magnetic disk and measurement positions of a plate thickness thereof.

FIG. 1 is a plan view of an embodiment of the present disclosure schematically illustrating a configuration of an aluminum alloy substrate for magnetic disk and measurement positions of a plate thickness thereof.

As illustrated in FIG. 1, an aluminum alloy substrate 1 for magnetic disk is a disk in a disk shape, and a circular through-hole 2 is concentrically provided in a central portion of the disk. A base material of the above described disk is not particularly limited, but it is preferable that the above described disk is made of aluminum or an aluminum alloy. Further, a thickness of the disk is not particularly limited, but is 500 μm or more and 1800 μm or less. Further, a size of the disk is not particularly limited, but, for example, so-called 3.5 inches, and 2.5 inches are cited.

The aluminum alloy substrate 1 for magnetic disk satisfies at least two of three inequalities of an inequality group [A] as follows and satisfies all of four inequalities of an inequality group [B] as follows, or satisfies at least two of the three inequalities of the inequality group [A] as follows and satisfies all of four inequalities of an inequality group [C] as follows, when a rolling line is defined as a rolling line direction, a direction parallel with the above described rolling line direction from a center S of a disk of a radius r is set as 0°, a clockwise direction is set as positive on a main surface of the above described disk, a plate thickness of the above described disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2 \text{ μm}, |t_{a2}-t_{b2}|\leq 0.2 \text{ μm}, |t_{a3}-t_{b3}|\leq 0.2 \text{ μm}\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

The above described inequality group [A] shows that combinations (a1; b1), (a2; b2) and (a3; b3) of the positions that are linearly symmetrical with respect to a line passing through the center S of the disk and parallel with a rolling line direction X are selected, differences in plate thickness at these positions are calculated, and at least two of absolute values of the plate thickness differences are 0.2 μm or less. Specifically, when at least two of the absolute values of the plate thickness differences are 0.2 μm or less, it can be determined that a plate thickness deviation with respect to the direction perpendicular to the rolling line direction X is small.

In the present embodiment, it is passable to satisfy at least one of the three inequalities of the above described inequality group [A], but from a viewpoint of decreasing the plate thickness deviation more with respect to the direction perpendicular to the rolling line direction X, it is preferable to satisfy all of the three inequalities of the above described inequality group [A].

The above described inequality group [B] shows that combinations (a1; a2), (a2; a3), (b1; b2) and (b2; b3) of positions on line segments parallel with the rolling line direction X are selected, plate thickness differences at these positions are calculated, and these plate thickness differences are all less than 0. Specifically, when the above described plate thickness differences are all less than 0, it can be determined that the plate thickness inclines from a rear side in the arrow direction of X to a front side, and has a gradient in one direction with respect to the rolling line direction X.

The above described inequality group [C] shows that the combinations (a1; a2), (a2; a3), (b1; b2) and (b2; b3) of the positions on the line segments parallel to the rolling line direction X are selected, plate thickness differences at these positions are calculated, and the plate thickness differences are all larger than 0. Specifically, when the above described plate thickness differences are all larger than 0, it can be determined that the plate thickness inclines as progress from the front side in the arrow direction of X toward the rear side, and has a gradient in one direction with respect to the rolling line direction X.

Figure 2B:
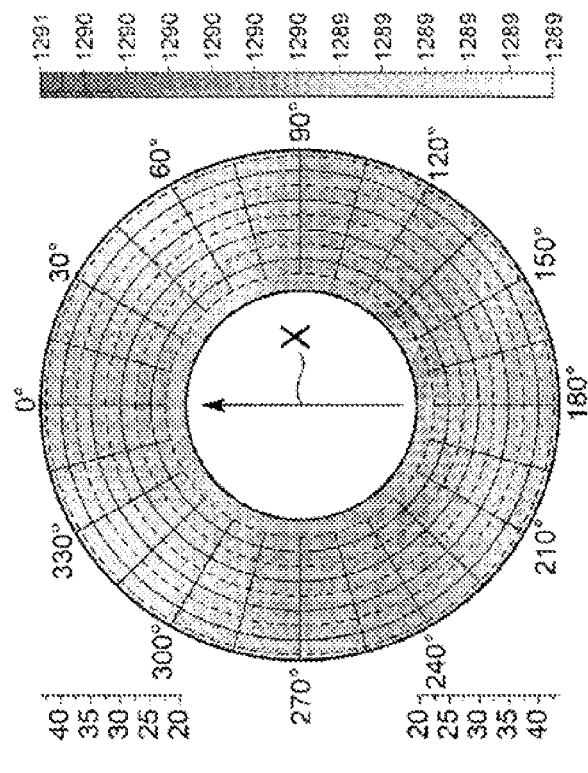
FIGS. 2A and 2B are plan views of the present embodiment each illustrating an example of a plate thickness distribution of the aluminum alloy substrate for magnetic disk.
Figure 2A:
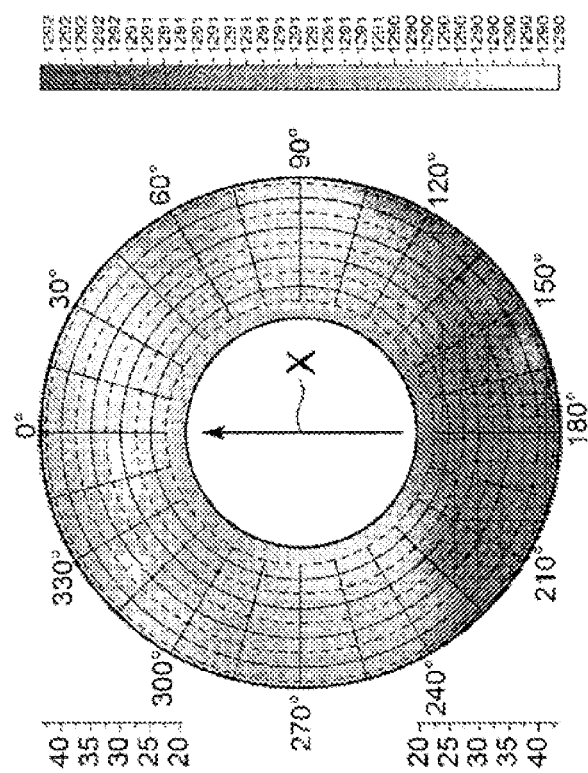

FIGS. 2A and 2B are plan views illustrating examples of the plate thickness distribution of the aluminum alloy substrate for magnetic disk according to the present embodiment. The drawings express the plate thicknesses at the positions by contrast of black and white, and shows that the plate thickness is small at the light color position (white portion), and the plate thickness is large at the dark color position (black portion).

The aluminum alloy substrate for magnetic disk as illustrated in FIG. 2A satisfies at least two of the three inequalities of the inequality group [A], and satisfies all of the four inequalities of the inequality group [B]. Accordingly, it is found that the plate thickness deviation is small with respect to the direction perpendicular to the rolling line direction X, the plate thickness has a gradient in one direction with respect to the rolling line direction X, and as the entire aluminum alloy substrate for magnetic disk, a plate thickness distribution is good.

Further, the aluminum alloy substrate for magnetic disk as illustrated in FIG. 2B satisfies at least two of the three inequalities of the inequality group [A], satisfies all of the four inequalities of the inequality group [B], and further satisfies all of four inequalities of an inequality group [D] as follows.

$$\{|t_{a1}-t_{a2}|<<0.5 \text{ μm}, |t_{a2}-t_{a3}|<0.5 \text{ μm}, |t_{b1}-t_{b2}|<0.5 \text{ μm}, |t_{b2}-t_{b3}|<0.5 \text{ μm}\} \quad [D]$$

The above described inequality group [D] shows that combinations (a1; a2), (a2; a3), (b1; b2) and (b2; b3) at the positions on the line segments parallel with the rolling line direction X are selected, absolute values of the plate thickness differences at these positions are calculated, and all of the absolute values of the plate thickness differences are less than 0.5 µm. Specifically, when all of the absolute values of the above described plate thickness differences are less than 0.5 µm, it can be determined that a degree of gradient with respect to the rolling line direction X is gradual, and the plate thickness deviation is small with respect to the direction parallel with the rolling line direction X.

Accordingly, it is found that the plate thickness deviation is small with respect to the direction perpendicular to the rolling line direction X, the plate thickness has a gradient in one direction with respect to the rolling line direction X, further, the plate thickness deviation is small with respect to the direction parallel with the rolling line direction X, and the aluminum alloy substrate for magnetic disk has an even better plate thickness distribution as a whole.

Figures 3A, 3B, 3C:
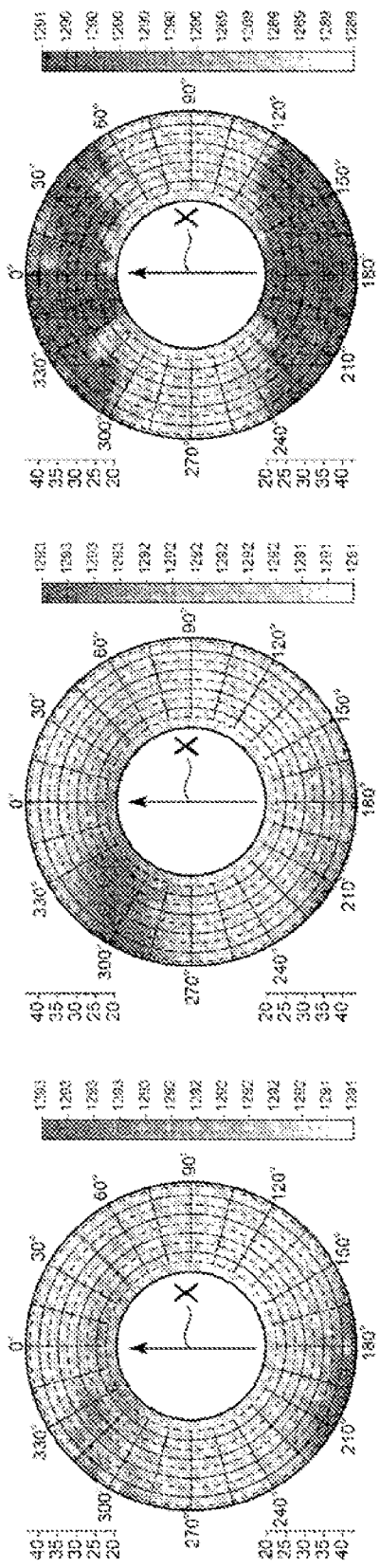
FIGS. 3A to 3C are plan views each illustrating a plate thickness distribution of a conventional aluminum alloy substrate for magnetic disk.

FIGS. 3A to 3C are plane views each illustrating a plate thickness distribution of a conventional aluminum alloy substrate for magnetic disk.

The conventional aluminum alloy substrate for magnetic disk in FIG. 3A only satisfies one of the three inequalities of the above described inequality group [A], and only satisfies two of the four inequalities of the above describe inequality group [B]. Further, the conventional aluminum alloy substrate in FIG. 3A only satisfies three of the four inequalities of the above described inequality group [D]. Accordingly, it is found that a plate thickness deviation is large with respect to the direction perpendicular to the rolling line direction X, the plate thickness does not have a gradient in one direction with respect to the rolling line direction X, and as the entire aluminum alloy substrate for magnetic disk, a plate thickness distribution is not good.

Further, the conventional aluminum alloy substrate for magnetic disk in FIG. 3B satisfies all of the four inequalities of the above described inequality group [B], but satisfies none of the three inequalities of the above described inequality group [A]. Further, the conventional aluminum alloy substrate for magnetic disk in FIG. 3B only satisfies two of the four inequalities of the above described inequality group [D]. Accordingly, it is found that a plate thickness deviation is large with respect to the direction perpendicular to the rolling line direction X, and a plate thickness distribution is not good as the entire aluminum alloy substrate for magnetic disk.

The conventional aluminum alloy substrate for magnetic disk of FIG. 3C only satisfies one of the three inequalities of the above described inequality group [A], and only satisfies two of the four inequalities of the above described inequality group [B]. Further, the conventional aluminum alloy substrate for magnetic disk of FIG. 3C only satisfies one of the four inequalities of the above described inequality group [D]. Accordingly, it is found that a plate thickness deviation is large with respect to the direction perpendicular to the rolling line direction X, the plate thickness does not have a gradient in one direction with respect to the rolling line direction X, the gradient is large as compared with FIG. 3A, and a plate thickness distribution is not good as the entire aluminum alloy substrate for magnetic disk.

Figure 4:
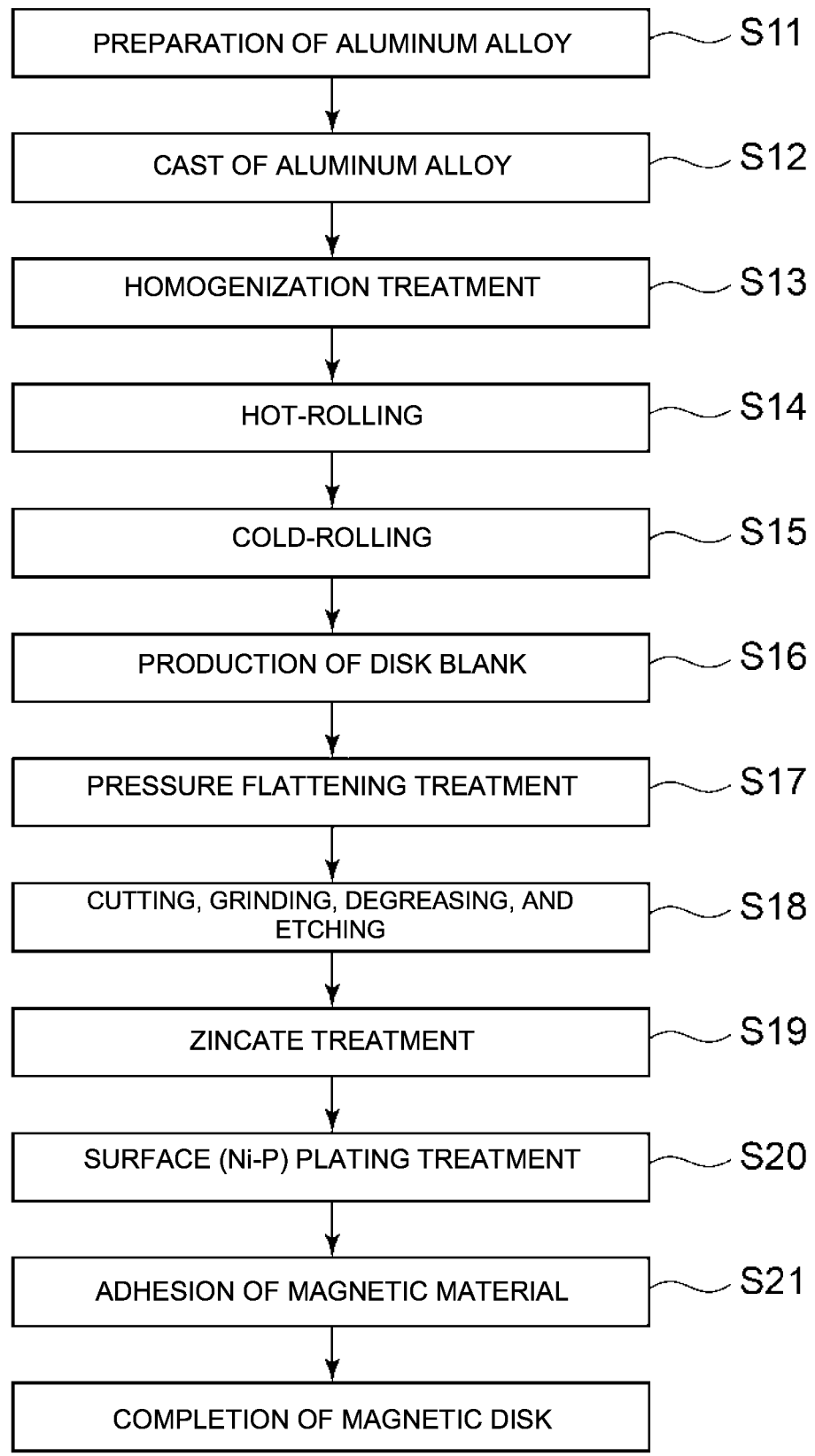
FIG. 4 is a flowchart of the present embodiment explaining a method for manufacturing an aluminum alloy substrate for magnetic disk.

FIG. 4 is a flowchart explaining a method for manufacturing the aluminum alloy substrate for magnetic disk and a magnetic disk according to the present embodiment.

Preparation of an aluminum alloy (step S11) to cutting, grinding, degreasing, and etching (step S18) are steps for manufacturing the aluminum alloy substrate for magnetic disk, and zincate treatment (step S19) to adhesion of a magnetic material (step S21) are steps for producing a magnetic disk from the manufactured aluminum alloy substrate for magnetic disk.

First, molten metal of an aluminum alloy having a desired component composition is prepared by heating and melting the aluminum alloy according to an ordinary method (step S11). Thereafter, the aluminum alloy is cast by a semi-continuous casting (DC casting) method, a continuous casting (CC) method or the like from the prepared molten metal of the aluminum alloy (step S12). It is preferable that a cooling rate at the time of casting is in a range of, for example, 0.1 to 1000° C./s, and as the casing method, a CC method having a higher cooling rate than a DC casting method is more preferable.

Thereafter, homogenization treatment of the cast aluminum alloy is carried out (step S13). The present homogenization treatment can be omitted, but when the homogenization treatment is carried out, it is preferable to perform the homogenization treatment under conditions of 400 to 550° C. for one hour or more, for example. Thereafter, the aluminum alloy to which the homogenized treatment is applied is hot rolled into a plate material (step S14). In hot-rolling, conditions thereof are not particularly limited, but it is preferable that a hot-rolling start temperature is in a range of 300 to 500° C., and it is preferable that a hot-rolling end temperature is in a range of 260 to 400° C.

Thereafter, the hot-rolled plate is cold-rolled into an aluminum alloy plate of approximately 1.0 mm (step S15). After an end of the hot-rolling, the aluminum alloy plate is finished to have a desired product plate thickness by cold-rolling. Conditions of cold-rolling are not particularly limited, but can be set according to required production plate strength, plate thickness and the like, and for example, a rolling rate can be made 20 to 80%. Before the cold-rolling or in a middle of the cold-rolling, annealing treatment may be applied to secure cold rolling workability. When annealing treatment is carried out, it is preferable to perform annealing under conditions of holding at 300 to 450° C. for 0.1 to 10 hours in the case of batch type heating, and it is preferable to perform annealing under conditions of holding at 400 to 500° C. for 0 to 60 seconds in the case of continuous heating. By going through the steps like this, it is possible to manufacture the aluminum alloy plate.

Thereafter, the aluminum alloy plate is punched into an annular shape, and the aluminum alloy substrate for magnetic disk that is a disk blank material is produced (step S16). Thereafter, pressure annealing at 300° C. or more and 400° C. or less for 30 minutes or more and 1200 minutes or less is applied to the aluminum alloy substrate for magnetic disk in the atmosphere, and a surface of the aluminum alloy substrate for magnetic disk is flattened (step S17). Thereafter, the aluminum alloy substrate for magnetic disk is cut, ground, degreased, and etched (step S18).

In the present embodiment, the aluminum alloy substrate for magnetic disk that is punched in step S16 satisfies at least two of the three inequalities of the above described inequality group [A] and satisfies all of the four inequalities of the above described inequality group [B], or satisfies at least one of the three inequalities of the above described inequality group [A] and satisfies all of the four inequalities of the above described inequality group [C]. Further, it can be inferred that the aluminum alloy substrate for magnetic disk after being subjected to pressure annealing in step S17 also satisfies the above described conditions similarly to the aluminum alloy substrate for magnetic disk that is punched in step S16.

A selection step that selects the aluminum alloy substrate for magnetic disk that satisfies the above described conditions may be included before the above described pressure annealing step (step S17) in the present method. The selection step is to select the aluminum alloy substrate for magnetic disk that satisfies at least one of the three inequalities of the above described inequality group [A] and satisfies all of the four inequalities of the above described inequality group [B], or satisfies at least one of the three inequalities of the above described inequality group [A] and satisfies all of the four inequalities of the above described inequality group [C], by using a plate thickness measuring device having a pair of heads of a capacitive displacement meter that will be described later, for example. Thereby, flatness of the entire aluminum alloy substrate for magnetic disk after pressure annealing can be more decreased.

Thereafter, zincate treatment (Zn substitution treatment) is applied to a surface of the aluminum alloy substrate for magnetic disk (step S19). Thereafter, surface treatment (Ni—P plating) is performed on the zincate-treated surface (step S20), and a magnetic material is caused to adhere to the surface-treated surface by sputtering (step S21). The magnetic disk is obtained from the aluminum alloy plate by goring through the steps as above.

The magnetic disk obtained by the above described manufacturing method is applied to a disk drive device such as a hard disk drive (hereinafter, referred to as "HDD"). A configuration of the disk drive device is not particularly limited, but includes, for example, a casing, one or a plurality of magnetic disks supported rotatably via a spindle in the casing, a magnetic head that performs data processing to the magnetic disk or disks, a swing arm that supports the magnetic head movably to the magnetic disk, and an actuator that rotates and positions the swing arm.

Similarly to the aluminum alloy substrate for magnetic disk, the above described magnetic disk satisfies at least two of the three inequalities of the inequality group [A] and satisfies all of the four inequalities of the inequality group [B], or satisfies at least two of the three inequalities of the inequality group [A] and satisfies all of the four inequalities of the inequality group [C], when the rolling line is defined as the rolling line direction, the direction parallel with the rolling line direction from the center of the disk of the radius r is set as 0°, the clockwise direction is set as positive on the main surface of the disk, the plate thickness of the disk at the position b1 represented by polar coordinates (0.72r, 45°) is defined as $t_{b1}$, the plate thickness at the position b2 represented by polar coordinates (0.53r, 90°) is defined as $t_{b2}$, the plate thickness at the position b3 represented by polar coordinates (0.72r, 135°) is defined as $t_{b3}$, the plate thickness at the position a1 represented by polar coordinates (0.72r, 315°) is defined as $t_{a1}$, the plate thickness at the position a2 represented by polar coordinates (0.53r, 270°) is defined as $t_{a2}$, and the plate thickness at the position a3 represented by polar coordinates (0.72r, 225°) is defined as $t_{a3}$.

In the disk drive device configured as described above, the entire magnetic disk is highly planarized, so that fluttering of the magnetic disk that is rotating at a high speed is suppressed, and it becomes possible to further improve flying stability of the magnetic head.

Figure 5:
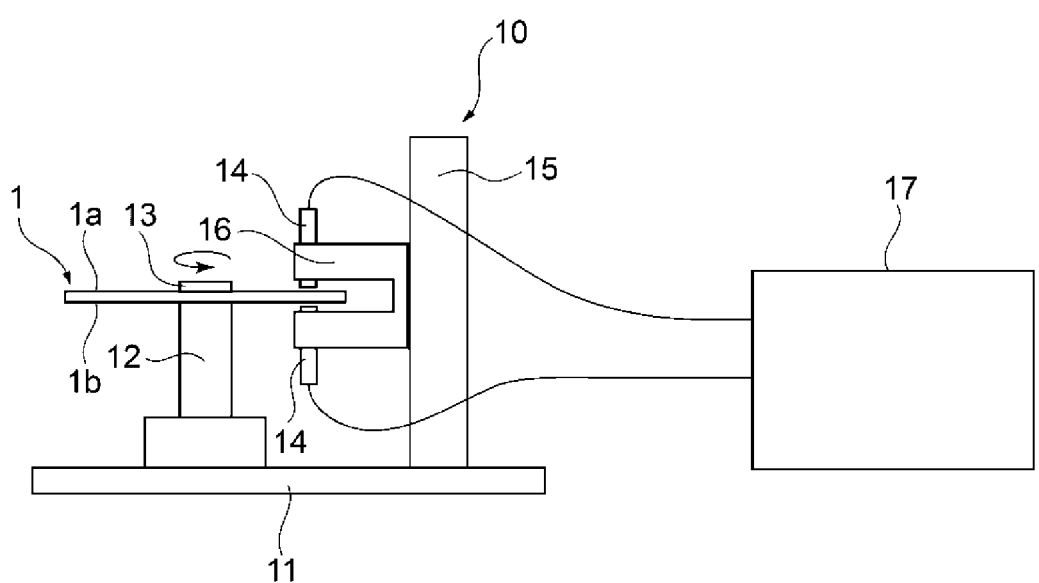
FIG. 5 is a side view schematically illustrating a configuration of a plate thickness measuring device that measures a plate thickness of the aluminum alloy substrate for magnetic disk in FIG. 1.

FIG. 5 is a side view schematically illustrating a configuration of the plate thickness measuring device that measures the plate thickness of the aluminum alloy substrate for magnetic disk in FIG. 1. The plate thickness measuring device can be used when the plate thickness of the aluminum alloy substrate for magnetic disk is measured in the above described selection step in the method for manufacturing the aluminum alloy substrate for magnetic disk, for example.

As illustrated in FIG. 5, a plate thickness measuring device 10 includes a base portion 11, a shaft portion 12 that is rotatably attached to the base portion 11, a grasping portion 13 that is provided on an upper end portion 12a of the shaft portion 12, and grasps an inner peripheral edge portion of the aluminum alloy substrate 1 for magnetic disk that is punched into an annular shape, a pair of sensor portions 14 and 14 that are arranged opposite each other on both sides in a thickness direction of the aluminum alloy substrate 1 for magnetic disk, a stage 15 that is attached to the base portion 11, and moves the pair of sensor portions 14 and 14 in a radial direction of the aluminum alloy substrate 1 for magnetic disk, a fixing portion 16 substantially U-shaped in section that fixes the pair of sensor portions 14 and 14 to the stage 15, and a capacitive displacement meter 17 that is connected to the pair of sensor portions 14 and 14, and measures the thickness of the aluminum alloy substrate 1 for magnetic disk based on respective physical quantities on a front surface side and a back surface side of the aluminum alloy substrate 1 for magnetic disk that are detected by the pair of sensor portions 14 and 14.

When the plate thickness is measured by using the plate thickness measuring device 10, the aluminum alloy substrate 1 for magnetic disk is fixed to the shaft portion 12 via the grasping portion 13, the aluminum alloy substrate 1 for magnetic disk is rotated by a predetermined angle in a circumferential direction of the aluminum alloy substrate for magnetic disk, and the pair of sensor portions 14 and 14 are moved in the radial direction of the aluminum alloy substrate 1 for magnetic disk. Further, the plate thickness of the aluminum alloy substrate 1 for magnetic disk is measured based on the respective physical quantities on a front surface 1a side and a back surface 1b side of the aluminum alloy substrate 1 for magnetic disk that are detected by the pair of sensor portions 14 and 14. Further, it is preferable to perform measurement after performing calibration with a standard sample that has already been measured with another plate thickness gauge before measurement. As the above described standard sample, for example, one that is randomly selected from a plurality of aluminum alloy substrates for magnetic disk, and has only part thereof measured is used.

The above described physical quantities refer to respective capacitances on the front surface 1a side and the back surface 1b side of the aluminum alloy substrate 1 for magnetic disk that are detected by the pair of sensor portions 14 and 14. The capacitive displacement meter 17 converts the capacitances into voltages, and calculates the thickness of the aluminum alloy substrate 1 for magnetic disk based on the above described voltages proportional to distances between the respective sensor portions of the pair of sensor portions 14 and 14 and a main surface of the aluminum alloy substrate 1 for magnetic disk that is a measurement target. Thereby, it is possible to measure the plate thicknesses at desired positions of the aluminum alloy substrate 1 for magnetic disk, and it is possible to acquire a plate thickness distribution of the entire aluminum alloy substrate 1 for magnetic disk.

When the plate thickness distribution of the entire aluminum alloy substrate 1 for magnetic disk is to be acquired, for example, the pair of sensor portions 14 and 14 are located at an arbitrary position in a vicinity of an inner peripheral edge portion of the aluminum alloy substrate 1 for magnetic disk, and are rotated by 5° with the position as a start point, and 72 spots are measured from 0° to 360° with the rolling line direction set as 0°, for example, specifically for one circumference. Thereafter, the pair of sensor portions 14 and 14 are moved by 3 mm outward in the radial direction, and are rotated by 5° in the same manner as described above to measure the 72 spots of one circumference. Subsequently, the pair of sensor portions 14 and 14 are moved by 3 mm outward in the radial direction to a position corresponding to an outside diameter of the aluminum alloy substrate 1 for magnetic disk, and measurement similar to the above description is repeatedly performed.

When the above described plate thickness distribution is to be acquired, a rotation angle unit of the aluminum alloy substrate 1 for magnetic disk is not limited to 5°, but may be another rotation angle unit such as 45°, for example. Further, when measurement for one circumference of the aluminum alloy substrate 1 for magnetic disk is performed, a measurement radius does not have to be constant, but the measurement radius may be changed according to a rotational position. Further, the method for acquiring the plate thickness distribution of the entire aluminum alloy substrate 1 for magnetic disk is not limited to the above description, but from the viewpoints of simplification and speedup of the determination processing, it is possible to determine whether or not the plate thickness distribution of the entire aluminum alloy substrate 1 for magnetic disk is good by measuring the plate thicknesses at a predetermined plurality of positions of the aluminum alloy substrate 1 for magnetic disk, for example, at the six positions as illustrated in FIG. 1, and determining whether or not the above described conditional expressions using the measured plurality of plate thicknesses are satisfied. Thereby, it is possible to easily determine whether or not the plate thickness distribution of the entire aluminum alloy substrate 1 for magnetic disk is good. Further, it is also possible to acquire the plate thickness distribution of the entire magnetic disk, or determine whether or not the plate thickness distribution of the entire magnetic disk is good, by the method similar to the above description by using the plate thickness measuring device 10.

While the aluminum alloy substrate for magnetic disk, the disk drive device, the method for manufacturing an aluminum aluminum alloy substrate for magnetic disk and the method for measuring an aluminum alloy substrate for magnetic disk according to the above described embodiment are described thus far, the present disclosure is not intended to be limited by the above described embodiment, and various modifications and changes are possible based on the technical idea of the present disclosure.

EXAMPLES

Hereinafter, examples of the present disclosure will be described.

Examples 1 to 2 and Comparative Examples 1 to 2

First, the molten metal of an aluminum alloy having the component composition including Mg: 3.8% by mass, Cu: 0.02% by mass, Zn: 0.3% by mass, Cr: 0.05% by mass, Si: 0.01% by mass, and Fe: 0.01% by mass, with the balance being aluminum and inevitable impurities was prepared by heating and melting according to an ordinary method, and subsequently, an aluminum alloy was cast from the prepared molten metal of the aluminum alloy at a cooling rate of 1.0° C./s by a semi-continuous casting (DC) method. Subsequently, after facing of 10 mm was performed for the aluminum alloy ingot, homogenization treatment at 530° C. for three hours was performed, hot-rolling was performed at a start temperature of 450° C., and cold-rolling was performed at a rolling rate of 57% to produce an aluminum alloy plate. Thereafter, the aluminum alloy plate was punched into an annular shape to produce an aluminum alloy substrate for magnetic disk that is a disk blank material.

Thereafter, the plate thickness measuring device as illustrated in FIG. 5 was prepared, and with the aluminum alloy substrate for magnetic disk produced in the above as a measurement target, the pair of sensor portions were arranged opposite to each other on a top and bottom of the aluminum alloy substrate for magnetic disk to measure the plate thicknesses $t_{a1}$, $t_{a2}$, $t_{a3}$, $t_{b1}$, $t_{b2}$, and $t_{b3}$ at the six positions a1, a2, a3, b1, b2 and b3 as illustrated in FIG. 1 by rotational movement of the aluminum alloy substrate for magnetic disk and linear movement in the radial direction of the pair of sensors.

Subsequently, the plate thickness differences corresponding to the respective terms of the inequality groups [A] to [D] were obtained, and the case where at least two of the three inequalities of the inequality group [A] were satisfied and all of the four inequalities of the inequality group [B] were satisfied, or the case where at least two of the three inequalities of the inequality group [A] were satisfied and all of the four inequalities of the inequality group [C] were satisfied was evaluated as good "○ circle".

Further, the case where at least two of the three inequalities of the inequality group [A] were satisfied, all of the four inequalities of the inequality group [B] were satisfied, and all of the four inequalities of the inequality group [D] were further satisfied, or the case where at least two of the three inequalities of the inequality group [A] were satisfied, all of the four inequalities of the inequality group [C] were satisfied, and all of the four inequalities of the inequality group [D] were further satisfied was evaluated as extremely good "⊚ double circle".

On the other hand, the case where one or none of the three inequalities of the inequality group [A] was satisfied, the case where any of the four inequalities of the inequality group [B] was not satisfied, or the case where any of the four inequalities of the inequality group [C] was not satisfied was evaluated as bad "x cross".

Further, flatnesses of the front surface and the back surface of each of the produced aluminum alloy substrates for magnetic disk were calculated, and an average value of the flatnesses was obtained. The flatness was calculated by an oblique incidence type flatness measuring machine (made by Corning Tropel Corp, machine name "FlatMaster"), and the case where the average value of the flatnesses is 4.4 μm or less was determined as good. The result is shown in Table 1.

TABLE 1

| | $t_{a1}$ (μm) | $t_{a2}$ (μm) | $t_{a3}$ (μm) | $t_{b1}$ (μm) | $t_{b2}$ (μm) | $t_{b3}$ (μm) | Condition of inequality group [A] | Condition of inequality group [B] or [C] | Condition of inequality group [D] | Flatness of front surface (μm) | Flatness of back surface (μm) | Average value (μm) | Judgement |
|---|---|---|---|---|---|---|---|---|---|---|---|---|---|
| Example 1 | 1290.55 | 1290.54 | 1291 | 1290.69 | 1290.48 | 1291.03 | ○ | ○ | X | 3.689 | 3.881 | 3.785 | ○ |
| Example 2 | 1289.8 | 1290.06 | 1289.9 | 1289.79 | 1289.99 | 1289.9 | ○ | ○ | ○ | 3.069 | 2.934 | 3.0015 | ◎ |
| Comparative example 1 | 1292.78 | 1292.46 | 1292.48 | 1292.74 | 1292.04 | 1292.21 | X | X | X | 5.22 | 4.681 | 4.9505 | X |
| Comparative example 2 | 1292.94 | 1292.44 | 1292.34 | 1292.43 | 1291.93 | 1291.78 | X | ○ | X | 4.529 | 4.448 | 4.4885 | X |

(Remark)
Condition of inequality group [A]: satisfy at least two of |a1 − b1| ≤ 0.2 μm, |a2 − b2| ≤ 0.2 μm, |a3 − b3| ≤ 0.2 μm
Condition of inequality group [B]: satisfy all of a1 − a2 < 0, a2 − a3 < 0, b1 − b2 < 0, b2 − b3 < 0
Condition of inequality group [C]: satisfy all of a1 − a2 > 0, a2 − a3 > 0, b1 − b2 > 0, b2 − b3 > 0
Condition of inequality group [D]: satisfy all of |a1 − a2| < 0.5 μm, |a2 − a3| < 0.5 μm, |b1 − b2| < 0.5 μm, |b2 − b3| < 0.5 μm As shown in Table 1, in example 1, all of the three inequalities of the inequality group [A] were satisfied, all of the four inequalities of the inequality group [B] were satisfied, and it was found that the plate thickness distribution of the entire aluminum alloy substrate for magnetic disk was good. Further, the average value of the flatnesses of the front surface and the back surface of the aluminum alloy substrate for magnetic disk was 3.785 μm, and it was confirmed that the flatness was good.

In example 2, all of the three inequalities of the inequality group [A] were satisfied, all of the four inequalities of the inequality group [B] were satisfied, and all of the four inequalities of the inequality group [D] were further satisfied, and it was found that the plate thickness distribution of the entire aluminum alloy substrate for magnetic disk was even better. Further, the average value of the flatness of the front surface and the back surface of the aluminum alloy substrate for magnetic disk was 3.0015 μm, and it was confirmed that the flatness was even better.

On the other hand, in comparative example 1, only one of the three inequalities of the inequality group [A] was satisfied, only two of the four inequalities of the inequality group [B] (or the inequality group [C]) were satisfied, and it was found that the plate thickness distribution of the entire aluminum alloy substrate for magnetic disk was poor. Further, the average value of the flatnesses of the front surface and the back surface of the aluminum alloy substrate for magnetic disk was 4.9505 μm, and was inferior to the average values of the flatnesses of examples 1 and 2.

Further, in comparative example 2, none of the three inequalities of the inequality group [A] was satisfied, only two of the four inequalities of the inequality group [B] (or the inequality group [C]) were satisfied, and it was found that the plate thickness distribution of the entire aluminum alloy substrate for magnetic disk was poor. Further, the average value of the flatness of the front surface and the back surface of the aluminum alloy substrate for magnetic disk was 4.4885 μm, and was inferior to the average values of the flatnesses of examples 1 and 2.

The invention claimed is:

1. An aluminum alloy substrate for magnetic disk, satisfying at least two of three inequalities of an inequality group [A] as follows and satisfying all of four inequalities of an inequality group [B] as follows, or
satisfying at least two of the three inequalities of the inequality group [A] as follows and satisfying all of four inequalities of an inequality group [C] as follows, when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

2. The aluminum alloy substrate for magnetic disk according to claim 1, further satisfying all of four inequalities of an inequality group [D] as follows.

$$\{|t_{a1}-t_{a2}|<0.5\ \mu m, |t_{a2}-t_{a3}|<0.5\ \mu m, |t_{b1}-t_{b2}|<0.5\ \mu m, |t_{b2}-t_{b3}|<0.5\ \mu m\} \quad [D]$$

3. The aluminum alloy substrate for magnetic disk according to claim 1, wherein the plate thickness of the disk is a value measured based on respective physical quantities on a front surface side and a back surface side of the disk, by using a pair of sensor portions of a capacitive displacement meter that are arranged opposite to each other on both sides in a thickness direction of the disk.

4. A disk drive device, comprising:
one or a plurality of magnetic disks rotatably supported via a spindle in a casing;
a magnetic head that performs data processing to the magnetic disk;
a swing arm that supports the magnetic head movably to the magnetic disk; and
an actuator that rotates and positions the swing arm, wherein the magnetic disk
satisfies at least two of three inequalities of an inequality group [A] as follows and satisfies all of four inequalities of an inequality group [B] as follows, or
satisfies at least two of the three inequalities of the inequality group [A] as follows and satisfies all of four inequalities of an inequality group [C] as follows, when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

5. A method for manufacturing an aluminum alloy substrate for magnetic disk, comprising:
    producing an aluminum alloy plate by performing casting, hot-rolling, and cold-rolling, as an aluminum alloy plate producing step;
    producing an aluminum alloy substrate for magnetic disk by punching the aluminum alloy plate into an annular shape, as a punching step; and
    applying pressure annealing to the aluminum alloy substrate for magnetic disk, as a pressure annealing step,
    wherein the aluminum alloy substrate for magnetic disk satisfies at least two of three inequalities of an inequality group [A] as follows and satisfies all of four inequalities of an inequality group [B] as follows, or
    satisfies at least two of the three inequalities of the inequality group [A] as follows and satisfies all of four inequalities of an inequality group [C] as follows,
    when a rolling line is defined as a rolling line direction, a direction parallel with the rolling line direction from a center of a disk of a radius r is set as 0°, a clockwise direction is set as positive on a main surface of the disk, a plate thickness of the disk at a position b1 represented by polar coordinates (0.72r, 45°) is defined as $t_{b1}$, a plate thickness at a position b2 represented by polar coordinates (0.53r, 90°) is defined as $t_{b2}$, a plate thickness at a position b3 represented by polar coordinates (0.72r, 135°) is defined as $t_{b3}$, a plate thickness at a position a1 represented by polar coordinates (0.72r, 315°) is defined as $t_{a1}$, a plate thickness at a position a2 represented by polar coordinates (0.53r, 270°) is defined as $t_{a2}$, and a plate thickness at a position a3 represented by polar coordinates (0.72r, 225°) is defined as $t_{a3}$.

$$\{|t_{a1}-t_{b1}|\leq 0.2\ \mu m, |t_{a2}-t_{b2}|\leq 0.2\ \mu m, |t_{a3}-t_{b3}|\leq 0.2\ \mu m\} \quad [A]$$

$$\{(t_{a1}-t_{a2})<0, (t_{a2}-t_{a3})<0, (t_{b1}-t_{b2})<0, (t_{b2}-t_{b3})<0\} \quad [B]$$

$$\{(t_{a1}-t_{a2})>0, (t_{a2}-t_{a3})>0, (t_{b1}-t_{b2})>0, (t_{b2}-t_{b3})>0\} \quad [C]$$

6. The method for manufacturing an aluminum alloy substrate for magnetic disk according to claim 5, further comprising, before the pressure annealing step, selecting an aluminum alloy substrate that satisfies at least two of the three inequalities of the inequality group [A] and satisfies all of the four inequalities of the inequality group [B], or satisfies at least two of the three inequalities of the inequality group [A] and satisfies all of the four inequalities of the inequality group [C], as a selection step.

7. The method for manufacturing an aluminum alloy substrate for magnetic disk according to claim 6, wherein the selection step further selects an aluminum alloy substrate that satisfies at least one of four inequalities of an inequality group [D] as follows.

$$\{|t_{a1}-t_{a2}|<0.5\ \mu m, |t_{a2}-t_{a3}|<<0.5\ \mu m, |t_{b1}-t_{b2}|<0.5\ \mu m, |t_{b2}-t_{b3}|<0.5\ \mu m\} \quad [D]$$

8. A method for measuring the aluminum alloy substrate for magnetic disk according to claim 1, comprising:
    rotating the aluminum alloy substrate for magnetic disk by a predetermined angle in a circumferential direction of the aluminum alloy substrate for magnetic disk, and moving a pair of sensor portions of a capacitive displacement meter in a radial direction of the aluminum alloy substrate for magnetic disk; and
    measuring a plate thickness of the aluminum alloy substrate for magnetic disk based on respective physical quantities on a front surface side and a back surface side of the aluminum alloy substrate for magnetic disk that are detected by the pair of sensor portions.

* * * * *